United States Patent [19]

Clarke

[11] 4,137,706
[45] Feb. 6, 1979

[54] ENGINE IN WHICH FUEL IS REACTED IN A PLURALITY OF STAGES

[75] Inventor: John M. Clarke, Banbury, England

[73] Assignee: Noel Penny Turbines Limited, Coventry, England

[21] Appl. No.: 796,153

[22] Filed: May 12, 1977

[30] Foreign Application Priority Data

May 14, 1976 [GB] United Kingdom ............... 19958/76

[51] Int. Cl.$^2$ ......................... F02C 3/20; F02B 43/00
[52] U.S. Cl. ............................. 60/39.12; 60/39.18 C; 60/39.46 R; 60/683
[58] Field of Search ........ 60/39.12, 39.18 C, 39.46 R, 60/39.46 S, 683; 110/28 J; 123/1 A

[56] References Cited

U.S. PATENT DOCUMENTS

| | | | |
|---|---|---|---|
| 2,298,663 | 10/1942 | Traupel | 60/39.18 C |
| 2,658,336 | 11/1953 | Traupel | 60/39.18 C |
| 3,717,129 | 7/1978 | Fox | 123/1 A |
| 3,756,022 | 9/1973 | Pronovost | 60/39.18 C |
| 3,804,606 | 4/1974 | Archer | 60/39.12 |
| 4,059,415 | 11/1977 | Kosaka et al. | 60/39.46 S |

FOREIGN PATENT DOCUMENTS

923316 4/1963 United Kingdom.
1138165 12/1968 United Kingdom.
1194586 6/1970 United Kingdom.

Primary Examiner—Louis J. Casaregola
Attorney, Agent, or Firm—Gifford, Chandler, VanOphem, Sheridan & Sprinkle

[57] ABSTRACT

An engine having a first reaction chamber to which fuel is to be supplied, either alone or with another reactant, and to which heat is applied to effect an endothermic chemical reaction to produce, under substantially reversible conditions, a reformed fuel, a second reaction chamber to which the reformed fuel discharged from the first reaction chamber is passed together with air or other reactant to effect an exothermic chemical reaction in the second reaction chamber, and a heat exchanger (conveniently of the fluidized bed type) to transfer heat produced by the exothermic reaction in the second reaction chamber to the first reaction chamber to effect the endothermic reaction.

8 Claims, 6 Drawing Figures

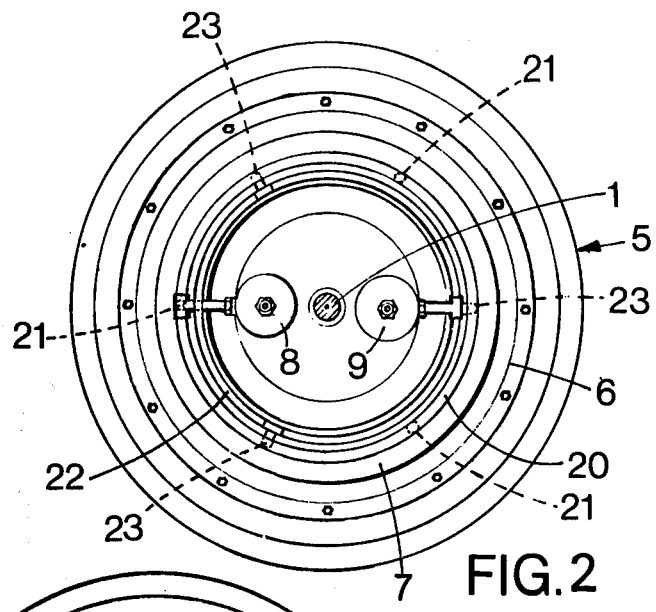
FIG. 2
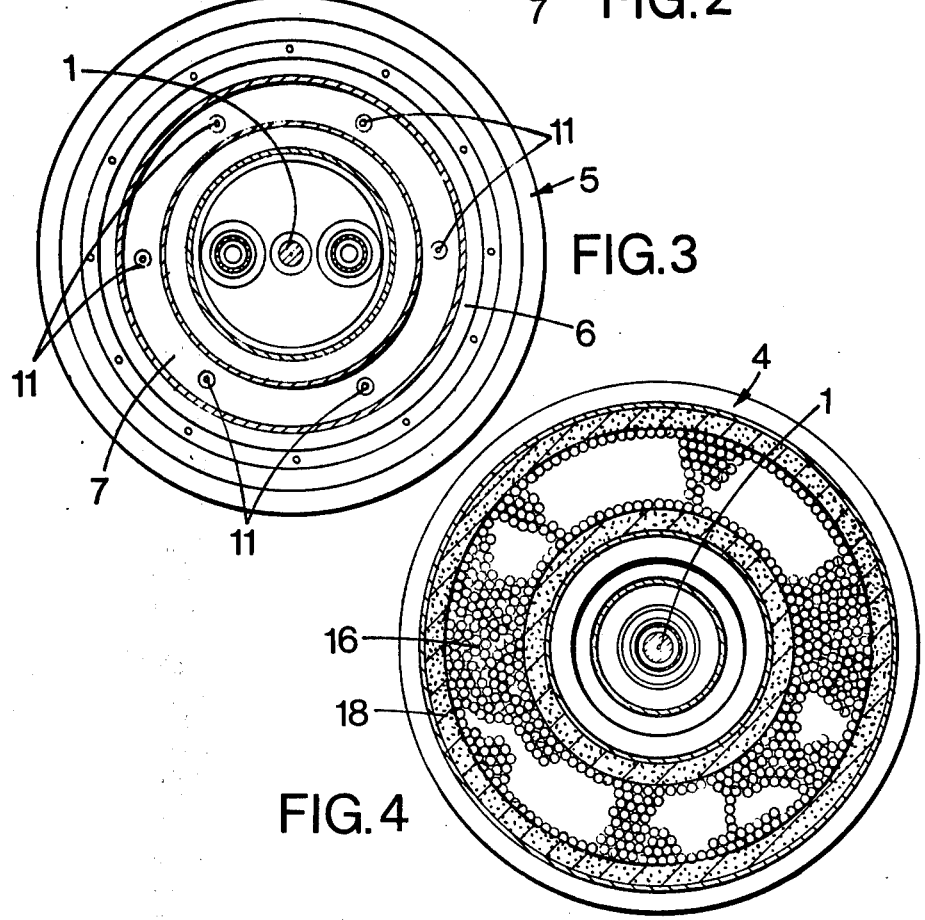
FIG. 3
FIG. 4

ENGINE IN WHICH FUEL IS REACTED IN A PLURALITY OF STAGES

BACKGROUND OF THE INVENTION

The invention relates to an engine in which instead of effecting the direct combustion of fuel in air in one stage of combustion, the fuel is reacted in a plurality of successive stages of which a first stage is an endothermic chemical reaction and a subsequent stage is an exothermic chemical reaction. Examples of gas turbine plant providing successive endothermic and exothermic chemical reactions are disclosed in British Pat. Specifications Nos. 1194586 of Motoren und Turbinen Union Munchen GMBH, 1138165 of M.A.N. Turbo GMBH and 923316 Maschinenfabrick Augsburg-Nurnberg A. G.

SUMMARY OF THE INVENTION

According to the invention, an engine comprises a first reaction chamber to which at least one reactant is introduced to produce, by an endothermic chemical reaction, under substantially reversible conditions, in said first reaction chamber, a combustible product, means defining an air passage in heat exchange relationship with said first reaction chamber, means for introducing the combustible product into said air passage, a second reaction chamber to which air from said air passage together with the combustible product from said first reaction chamber are passed to effect an exothermic chemical reaction in said second reaction chamber, heat exchange means in said second reaction chamber defining with said second reaction chamber a first heat exchange path through which air is led to said air passage and a second heat exchange path, in indirect heat exchange relation to said first heat exchange path, through which air and said combustible product are passed to effect said exothermic chemical reaction and to impart heat to air passing through said first heat exchange path to said air passage, air-path defining means, including said first heat exchange path and said air passage connected in series, and power-producing means positioned in said air-path defining means and through which air flowing through said air passage is passed during operation of the engine.

The combustible product from the first reaction chamber in which the endothermic chemical reaction occurs is herein called "reformed fuel" and is produced by reacting a fuel with itself, water or a restricted supply of air substantially reversibly at a lower temperature than that at which normal combustion occurs, whereby the reformed fuel has a lower equilibrium reaction temperature with air and can be burnt with lower losses at practicably acceptable temperatures.

Conveniently, the second reaction chamber and the heat exchange means together comprise a fluidised bed heat exchanger having a bed through which the reformed fuel from the first reaction chamber is passed together with air or other reactant, the air or other reactant having been preheated by being passed through a heat exchanger path heated by the fluidised bed.

The second reaction chamber and the heat exchange means may alternatively together comprise a plurality of fluidised beds arranged in series or cascade, through the first of which with respect to the direction of flow of the reformed fuel from the first reaction chamber, the reformed fuel is passed together with air or other reactant, the air or other reactant having been preheated by being passed through a heat exchange path heated by the fluidised beds, the products from the exothermic reaction in the first fluidised bed being passed through the downstream fluidised bed, or fluidised beds in succession, the temperature of each fluidised bed being lower than the immediately preceding fluidised bed in the direction of flow of reformed fuel or said products.

The power-producing means may comprise at least one turbine through which a stream of compressed air or other reactant heated by the exothermic chemical reaction in the fluidised bed heat exchanger is passed before its introduction to the fluidised bed or beds together with the reformed fueld from the first reaction chamber.

By effecting the reaction of fuel in a first stage to produce the reformed fuel by an endothermic reaction followed by an exothermic reaction of the reformed fuel in one, or in a plurality of reaction chambers in succession and at a decreasing temperature, a significant reduction in fuel consumption occurs.

BRIEF DISCRIPTION OF THE DRAWINGS

By way of example, an engine incorporating the aforesaid endothermic and exothermic reaction stages is now described with reference to the accompanying drawings, in which:

FIG. 2 is a transverse section through the engine on the line II—II in FIG. 1;

FIG. 3 is a transverse section through the engine on the line III—III in FIG. 1;

FIG. 4 is a transverse section through the engine on the line IV—IV in FIG. 1;

DESCRIPTION OF THE PREFERRED EMBODIMENTS

Figure 1:
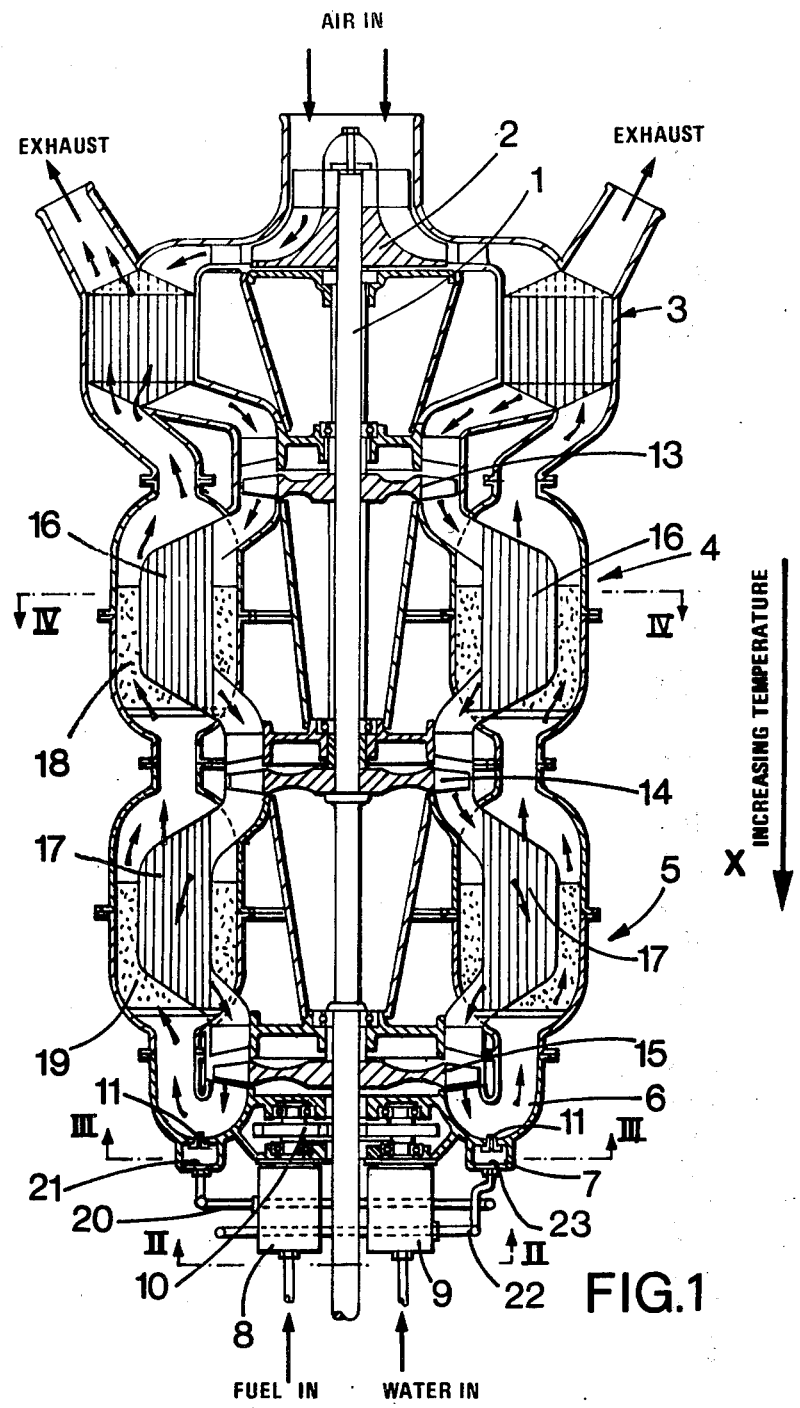
FIG. 1 is an axial section through the engine.

Referring to FIGS. 1 to 4, the engine comprises a shaft 1 carrying an air compressor rotor 2. This draws in air from the atmosphere and discharges compressed air to a heat exchanger 3 heated by exhaust gases, as hereinafter explained. Heated air from the heat exchanger 3 passes through heating passages 16, 17 (e.g., tubes) in two fluidised bed heat exchangers 4 and 5 respectively, where the air is successively further heated and expanded through turbine rotors 13, 14 and 15. The air then passes to an annular duct 6 adjacent an annular mixing chamber 7 from which reformed fuel, as hereinbefore defined, is discharged through a plurality of (e.g., six) nozzles 11 spaced apart in a circle in the lower wall, as viewed in FIG. 1, of the annular duct 6. The formation of the reformed fuel in the mixing chamber is referred to hereinafter. The reformed fuel from the nozzles 11 mixes with the heated air passing through the annular duct 6 and the resulting mixture is then passed through the fluidised bed 19 of the fluidised bed heat exchanger 5 and a first exothermic reaction of the reformed fuel with air occurs. Then the products of the first exothermic reaction are passed through the fluidised bed 18 of the fluidised bed heat exchanger 4 where a second exothermic reaction occurs. Heat from each of the exothermic reactions in the fluidised beds 19, 18 is imparted to the air flowing from the heat exchanger 3 to the annular duct 6. Finally hot exhaust gases from the fluidised bed 18 of the fluidised bed heat exchanger 4 pass through the heat exchanger 3 before being exhausted to atmosphere and thus initially heat the compressed air discharged from the compressor 2 before the air enters the heating passages of the fluidised bed heat exchanger 4 and 5. The exothermic reaction occurring in the fluidised bed heat exchanger 5 is hotter than that in the fluidised bed heat exchanger 4 and so there is increasing temperature in both air and reformed fuel streams in the direction of arrow X. The temperature of each exothermic reaction is preferably maintained at or near to the equilibrium temperature by the design of the fluidised beds. The shaft 1 carries the aforesaid turbine rotors 13, 14 and 15 positioned in the air stream from the compressor 2 to the annular duct 6 and located respectively upstream of the fluidised bed heat exchanger 4, between the fluidised bed heat exchangers 4 and 5 and downstream of the fluidised bed heat exchanger 5 with respect to the direction of flow of the air stream. Air is expanded through the turbine rotors 13, 14 and 15 and thus energy is extracted from the air to drive the compressor rotor 2. Excess energy is available as shaft power at the shaft 1. The heat exchanger 3 may be of any suitable kind, e.g., a counterflow recuperative heat exchanger, as shown.

The reformed fuel is produced in the annular mixing chamber 7 from a mixture of vaporised liquid fuel and water by an endothermic reaction. The fuel and water required for this are discharged from fuel and water pumps 8 and 9 driven by a gear drive 10 from the shaft 1. The fuel pump 8 delivers fuel through a delivery pipe 20 in the shape of a closed ring to a plurality of spaced (e.g., three) ports 21 and the water pump delivers water through a delivery pipe 22 in the shape of a closed ring to a plurality of (e.g., three) spaced ports 23, alternately arranged with the ports 21 in the bottom wall as in FIG. 1 of the mixing chamber 7. The heat required for the endothermic reaction is obtained by heat transfer through the wall between the duct 6 and the chamber 7.

Figure 5:
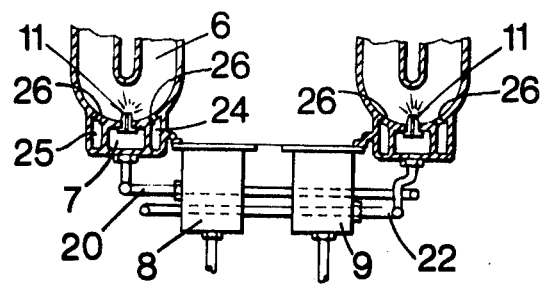
FIG. 5 shows a modification to the part of the engine shown in FIG. 1 for producing the aforesaid reformed fuel.

If necessary, additional heat for effecting the endothermic reaction may be produced by providing annular heating chambers around the mixing chamber 7, the annular heating chambers receiving hot air introduced from the duct 6. This modification is shown in FIG. 5 in which the annular heating chambers are shown at 24 and 25 one at each side of the chamber 7, and holes by which hot air from the duct 6 can enter the annular heating chambers 24, 25 are indicated at 26.

Although a single endothermic reaction stage and two series or cascaded exothermic reaction stages are illustrated, any other number of successive endothermic reaction stages and any number of successive exothermic reaction stages may be employed. For example, by employing two or more endothermic reaction stages the maximum temperature of the engine cycle would be reduced.

Figure 6:
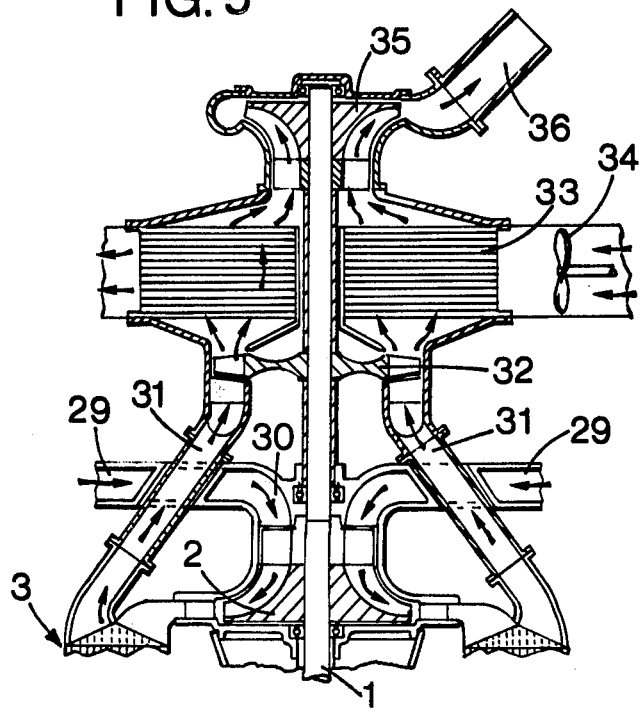
FIG. 6 shows a modification to the part of the engine shown in FIG. 1, including the original exhaust gas stage of the engine, the modification comprising a further exhaust gas stage in series with the original exhaust gas stage.

Although the exhaust gases from the heat exchanger 3 are discharged directly to atmosphere, they can be expanded to a sub-atmospheric pressure through a turbine, cooled and then re-compressed for discharge to atmosphere, thereby further reducing exhaust gas losses. A modification of the engine shown in FIG. 1 having this further exhaust stage is shown in FIG. 6. Air is introduced through radial pipes 29 to an annular inlet 30 to the compressor 2, which is otherwise as shown in FIG. 1. An annular exhaust gas outlet 31 leads from the heat exchanger 3, which is otherwise the same as in FIG. 1. The exhaust gas outlet 31 leads to a turbine 32 which expands the exhaust gases to a sub-atmospheric pressure. The exhaust gases are then passed through a heat exchanger 33, in which they are cooled by ambient air drawn through the heat exchanger 33 by a fan 34. After being discharged from the heat exchanger 33, the cooled exhaust gases at subatmospheric pressure are recompressed to atmospheric pressure by a compressor 35. The exhaust gases are then discharged to atmosphere through exhaust duct 36. The turbine rotor 32 and the compressor rotor 35 are mounted on the shaft 1, which is longer than the corresponding shaft 1 shown in FIG. 1. The fan 34 may be driven by the shaft 1. The remainder of the engine is the same as in FIGS. 1-4. The heat exchanger 33 may be of any suitable air/gas type. For example, it may be of the same recuperative type as the heat exchanger 3.

Although turbine rotors 13, 14 and 15 are described as the means of extracting energy from the heated air, alternatively the exhausted gases from each endothermic or exothermic reaction stage may be used to effect reciprocation of pistons, the latter being employed to effect compression of the air and to provide shaft output power.

The successive endothermic and exothermic reaction stages of the engine according to this invention enable a reversible or substantially reversible combustion condition to be achieved, thereby producing a higher thermal efficiency and a lower specific fuel consumption than can occur in orthodox engines.

What I claim as my invention and desire to secure by Letters Patent of the United States is:

1. An engine comprising a first reaction chamber to which at least one reactant is introduced to produce, by an endothermic chemical reaction, under substantially reversible conditions, in said first reaction chamber, a combustible product, means defining an air passage in heat exchange relationship with said first reaction chamber, means for introducing the combustible product into said air passage, a second reaction chamber to which air from said air passage together with the combustible product from said first reaction chamber are passed to effect an exothermic chemical reaction in said second reaction chamber, heat exchange means in said second reaction chamber defining with said second reaction chamber a first heat exchange path through which air is led to said air passage and a second heat exchange path, in indirect heat exchange relation to said first heat exchange path, through which air and said combustible product are passed to effect said exothermic chemical reaction and to impart heat to air passing through said first heat exchange path to said air passage, air-path defining means, including said first heat exchange path and said air passage connected in series, and power-producing means positioned in said air-path defining means and through which air flowing through said air passage is passed during operation of the engine.

2. An engine as claimed in claim 1 in which said second reaction chamber and said heat exchange means together comprise a fluidised bed heat exchanger having a bed, defining said second heat exchange path, through which the combustible product from said first reaction chamber and air from said air passage are passed, and duct means, defining said first heat exchange path, extending through the bed of said fluidised bed heat exchanger.

3. An engine as claimed in claim 1 in which said second reaction chamber and said heat exchange means together comprise a plurality of fluidised beds arranged in series, and together defining said second heat exchange path, and through the first of which fluidised beds, with respect to the direction of flow of the combustible product from said first reaction chamber, the combustible product is passed together with air from said air passage, the products from the exothermic reaction in said first fluidised bed being passed through at least one other of said fluidised beds, the temperature of each fluidised bed being lower than the immediately preceding fluidised bed in the direction of flow of the respective products from the endothermic and exothermic reactions and each fluidised bed having duct means extending therethrough in series flow and defining said first heat exchange path.

4. An engine as claimed in claim 1 in which said power-producing means comprises at least one turbine rotor through which a stream of compressed air is expanded during its passage through said air-path defining means, said engine also including an air compressor rotor for producing a stream of compressed air to be passed through said air-path defining means and shaft means interconnecting said compressor rotor and said power-producing means.

5. An engine as claimed in claim 3 in which there is a plurality of turbine rotors positioned in said air-path defining means at positions respectively upstream of said first fluidised bed, between each pair of adjacent fluidised beds and downstream of the last fluidised bed in the direction of flow of the respective products from the endothermic and exothermic reactions, the engine also including a compressor rotor for producing a stream of air to be passed through said air-path defining means and shaft means on which said turbine rotors and said compressor rotor are mounted.

6. An engine as claimed in claim 5 in which there is a further heat exchanger positioned to receive compressed air from the compressor rotor prior to its expansion through any of said turbine rotors and products discharged from the extreme downstream fluidised bed prior to their exhaust from the engine.

7. An engine as claimed in claim 6 including a further turbine having a rotor mounted on said shaft means, through which said further turbine the exhaust products from said further heat exchanger are, in operation of the engine, expanded to a sub-atomspheric pressure, yet another heat exchanger, acting as a cooler, connected to cool the exhaust products discharged through said further turbine and a further compressor having a rotor mounted on said shaft means, by which said further compressor, in operation of the engine, the exhaust products are re-compressed and discharged to atmosphere.

8. An engine as claimed in claim 1 in which said first reaction chamber includes a heating chamber through which heated air from said air passage is passed.

* * * * *

UNITED STATES PATENT AND TRADEMARK OFFICE
CERTIFICATE OF CORRECTION

PATENT NO. : 4,137,706

DATED : February 6, 1979

INVENTOR(S) : John Michael Clarke

It is certified that error appears in the above-identified patent and that said Letters Patent are hereby corrected as shown below:

Column 2, line 14, delete "fueld" and insert --fuel-- therefor;

Column 4, line 10, delete "subatmospheric" and insert --sub-atmospheric therefor;

Column 6, line 19, delete "atomspheric" and insert --atmospheric-- therefor;

Signed and Sealed this

First Day of May 1979

[SEAL]

Attest:

RUTH C. MASON
Attesting Officer

DONALD W. BANNER
Commissioner of Patents and Trademarks